United States Patent [19]

Guillaume et al.

[11] Patent Number: 4,525,066

[45] Date of Patent: Jun. 25, 1985

[54] METHOD AND DEVICE FOR MEASURING TEMPERATURE USING A DIFFRACTION GRATING

[76] Inventors: Michel Guillaume, Les Blétières - Les Adrets, 38190 Brignoud; Michel Pichot, 11 Chemin du Couvent, 38100 Grenoble, both of France

[21] Appl. No.: 396,446

[22] Filed: Jul. 8, 1982

[30] Foreign Application Priority Data

Jul. 21, 1981 [FR] France .................. 81 14176

[51] Int. Cl.³ .................. G01J 5/08; G01J 5/38
[52] U.S. Cl. .................. 356/43; 374/161
[58] Field of Search .................. 356/43, 45, 32; 374/161, 187; 350/162.17

[56] References Cited

U.S. PATENT DOCUMENTS

| 3,458,257 | 7/1969 | Pryor | 356/32 |
| 3,628,866 | 12/1971 | Mueller | 356/32 X |
| 4,355,898 | 10/1982 | Dakin | 350/762.17 X |

*Primary Examiner*—Vincent P. McGraw
*Attorney, Agent, or Firm*—Oblon, Fisher, Spivak, McClelland & Maier

[57] ABSTRACT

The invention relates to a temperature measuring method and device. The device comprises a diffraction grating raised to the temperature to be measured, a monochromatic light beam source in which the beam is directed on to the grating and means for measuring the angular position of the diffracted beam.

It is used in measuring the temperature of materials immersed in an ionized medium.

10 Claims, 4 Drawing Figures

METHOD AND DEVICE FOR MEASURING TEMPERATURE USING A DIFFRACTION GRATING

BACKGROUND OF THE INVENTION

The present invention relates to a temperature measuring method and device, which use a diffraction grating. It is used more particularly in the measurement of the temperature of materials immersed in an ionized medium.

The measurement of the temperature of a semiconductor substrate during treatment (by ion implantation, deposition of layers, annealing, etc.) is a difficult problem due to the special properties of the medium in which the substrate is immersed. In particular, any mechanical or electrical contact must be prevented. However, the temperature of the surface of such a substrate is a vital manufacturing parameter, which must be repeatedly and carefully checked.

Hitherto no satisfactory means has been proposed for carrying out this check or control under such conditions.

BRIEF SUMMARY OF THE INVENTION

The invention obviates this deficiency by proposing a method and a device making it possible to measure the temperature of a material without any mechanical contact therewith. For this purpose the invention recommends the use of optical means and in particular a diffraction grating. The conditions under which a light beam is diffracted by a grating depend on the spacing of the latter. If the grating is raised to the temperature to be measured, the spacing is a function of this temperature and the diffraction conditions themselves become dependent on this temperature. The measurement of the position of the diffracted grating consequently gives details on the temperature to be measured.

The present invention more specifically relates to a method for measuring temperature wherein a diffraction grating is heated to the temperature to be measured, a monochromatic light beam is directed on to the grating and is diffracted there, and the angular position of the diffracted beam is measured, this being a function of the temperature.

The invention also relates to a temperature measuring device for performing the method defined hereinbefore. The temperature measuring device comprises a diffraction grating heated to the temperature to be measured, a monochromatic light beam source, said beam being directed on to the grating, and means for measuring the angular position of the diffracted beam.

BRIEF DESCRIPTION OF THE DRAWINGS

The invention is described in greater detail hereinafter relative to non-limitative embodiments and with reference to the attached.

DETAILED DESCRIPTION OF THE PREFERRED EMBODIMENTS

Figure 1:
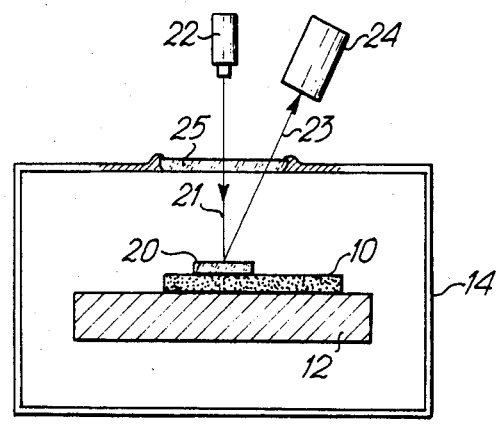
FIG. 1 a diagram of a device according to the invention.

The installation illustrated in FIG. 1 comprises a substrate 10 carried by a base plate 12 located in a vacuum treatment enclosure 14. The treatment means are not shown and they in fact comprise crucibles for vacuum deposits, ion implantation means, etc.

According to the invention for measuring the temperature of the surface of substrate 10, a diffraction grating 20 is placed thereon, the grating is illuminated with a monochromatic radiation beam 21 from a source 22, the diffracted beam 23 is collected, and the angular position of the beam is measured by an optical means 24. The incident beam 21 and diffracted beam 23 pass through the enclosure 14 via a transparent window 25.

It is naturally possible to directly etch the diffraction grating 20 on substrate 10, if the material from which the latter is made is suitable. For example, this may be the case with silicon substrates.

The temperature of the grating can be determined on the basis of the angular position of the diffracted beam either by calculation when the expansion coefficient of the material forming the grating and the spacing thereof at a given temperature are known, or by prior calibration.

According to a variant the measurement is given a differential nature by using an additional grating, whose temperature is maintained at a given value (which is optionally regulatable) and whose spacing is close to that of the measurement grating. According to this differential variant at the outlet of the measurement grating the single diffracted beam is replaced by two diffracted beams, whose orders are opposed (respectively +n and −n in which n is an integer equal to or higher than 1) and the additional grating is positioned on the path of the two beams. Among the beams diffracted by the additional grating, the beams of order −n and n have the special feature of being parallel if the two gratings are identical. Thus, for special paths, the deviations due to the diffraction on the two gratings are equal and have opposite signs. If the measurement grating undergoes a variation in its spacing due to the modification to its own temperature, the two output beams of the device stop being parallel and their angular variation is an indication of the temperature variation between the two gratings.

Figure 2:
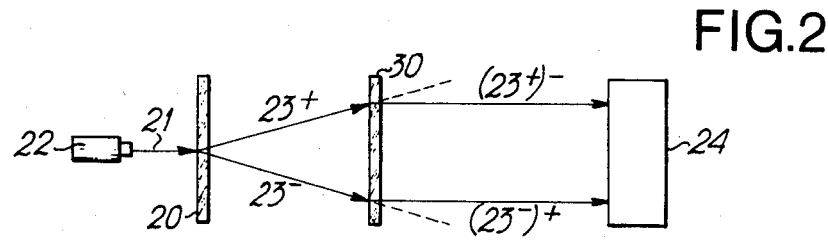
FIG. 2 a variant with two gratings working in transmission.
Figure 3:
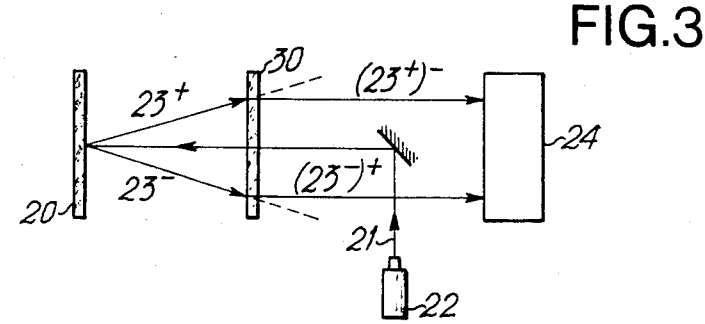
FIG. 3 a variant with a measuring grating working in reflection and a reference grating working in transmission.
Figure 4:
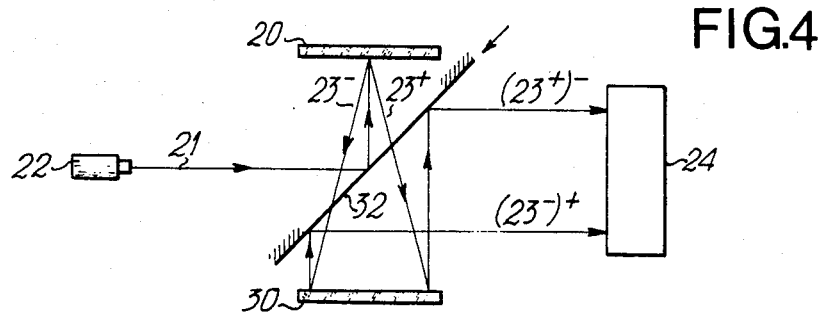
FIG. 4 a variant with two gratings working in reflection.

This differential variant is illustrated in FIGS. 2 to 4 showing the additional grating 30. In FIG. 2 the two gratings work in transmission. In FIG. 3 the measurement grating 20 works in reflection and the reference grating 30 in transmission. In FIG. 4 the two gratings work in reflection due to a beam splitter 32.

In the drawings it is assumed that working takes place with orders of diffraction n = ±1. Grating 20 then gives rise to two beams designated 23+ and 23−. Beam 23+ strikes the reference grating 30 and gives rise to two diffracted beams, whereof only the beam of order −1 is used. It is designated (23+)−. In the same way beam 23− gives rise to two diffracted beams after grating 30, only that of order +1 being used, i.e. (23−)+. Beams (23+)− and (23−)+ are parallel if the two gratings are in identical conditions for the reasons referred to hereinbefore. If this is not the case, the measurement of their angular variation provides information on the temperature of the measurement grating.

In practice source 22 can be a laser, e.g. a neon-helium gas laser operating at 6328 Å. Measuring means 24 can be a telescope. The gratings can be amplitude gratings or phase gratings.

What is claimed is:

1. A temperature measuring device comprising a first diffraction grating heated to the temperature to be measured, a monochromatic beam source emitting a light beam directed onto said first grating, said light beam given two once diffracted beams after said first grating with opposite diffraction orders +n and −n (in which n is an integer equal to or above 1), a second diffraction grating placed on the paths of said two diffracted beams, said first and second gratings having similar spacings, said second grating being raised to a reference temperature, each once diffracted beam of orders +n and −n impinging onto said second grating and given twice diffracted beams of orders respectively −n and +n, and measuring means positioned so as to receive said twice diffracted beams, said measuring means being able to measure the angular variation between said twice diffracted beams.

2. A temperature measuring device comprising:
   (a) a first diffraction grating which, during use of the device, is heated to the temperature to be measured;
   (b) a monochromatic light beam source positioned to emit a light beam directed onto said first grating, said first diffraction grating functioning to split the light beam emitted by said light beam source into two once-diffracted beams having opposite diffraction orders +n and −n (n being an integer equal to or greater than 1);
   (c) a second diffraction grating positioned in the paths of said two once-diffracted beams, said second diffraction grating having gratings which bear a known relationship to the gratings of said first diffraction grating, said second diffraction grating being maintained at a reference temperature during use of the device and functioning to split each of the two once-diffracted beams into twice-diffracted beams having opposite diffraction orders +n and −n (n again being an integer equal to or greater than 1); and
   (d) measuring means positioned so as to receive at least one of each pair of twice-diffracted beams, said measuring means producing an indication of temperature to be measured based on the angular variation between said at least one of each pair of twice-diffracted beams.

3. A temperature measuring device as recited in claim 2 wherein:
   (a) the gratings of said first and second diffraction gratings are identical and
   (b) said at least one of each pair of twice-diffracted beams have opposite diffraction orders,
   whereby said at least one of each pair of twice-diffracted beams are parallel if the temperature to be measured is identical to the reference temperature.

4. A temperature measuring device as recited in claim 2 wherein both of said first and second diffraction gratings work in transmission.

5. A temperature measuring device as recited in claim 2 wherein one of said first and second diffraction gratings works in transmission and one of said first and second diffraction gratings works in reflection.

6. A temperature measuring device as recited in claim 2 wherein both of said first and second diffractions work in reflection.

7. A temperature measuring device as recited in claim 2 wherein said first and second diffraction gratings are amplitude gratings.

8. A temperature measuring device as recited in claim 2 wherein said first and second diffractions gratings are phase gratings.

9. A temperature measuring device as recited in claim 2 wherein said monochromatic light beam source is a laser.

10. A temperature measuring device as recited in claim 2 and further comprising a treatment enclosure, said first diffraction grating being located inside said treatment enclosure and said second diffraction grating being located outside said treatment enclosure.

* * * * *